United States Patent [19]
Lindenstruth

[11] Patent Number: 6,067,595
[45] Date of Patent: May 23, 2000

[54] METHOD AND APPARATUS FOR ENABLING HIGH-PERFORMANCE INTELLIGENT I/O SUBSYSTEMS USING MULTI-PORT MEMORIES

[75] Inventor: Volker Lindenstruth, El Cerrito, Calif.

[73] Assignee: iCore Technologies, Inc., Dayton, Ohio

[21] Appl. No.: 08/935,921

[22] Filed: Sep. 23, 1997

[51] Int. Cl.[7] ................................. G06F 13/14
[52] U.S. Cl. .................. 710/129; 710/128; 710/131; 711/149; 711/150; 365/230.05
[58] Field of Search .................. 395/306–312, 395/856–859, 881–892; 711/147–150; 710/241, 243–244; 365/230.05

[56] References Cited

U.S. PATENT DOCUMENTS

| | | | |
|---|---|---|---|
| 3,787,818 | 1/1974 | Arnold et al. | 340/172.5 |
| 4,564,782 | 1/1986 | Smitt | 364/200 |
| 4,937,788 | 6/1990 | Harada | 365/189.04 |
| 5,130,981 | 7/1992 | Murphy | 370/85.6 |
| 5,214,760 | 5/1993 | Hammond et al. | 395/250 |
| 5,440,523 | 8/1995 | Joffe | 365/230.05 |
| 5,459,851 | 10/1995 | Nakajima et al. | 395/476 |
| 5,586,299 | 12/1996 | Wakerly | 711/149 |
| 5,590,087 | 12/1996 | Chung et al. | 365/230.05 |
| 5,640,456 | 6/1997 | Adams, Jr. et al. | 380/49 |
| 5,659,518 | 8/1997 | McLaudy | 365/230.05 |
| 5,659,687 | 8/1997 | Kim et al. | 395/292 |
| 5,734,847 | 3/1998 | Garbus et al. | 395/308 |
| 5,737,569 | 4/1998 | Nadir et al. | 711/149 |
| 5,748,921 | 5/1998 | Lambrecht et al. | 395/308 |
| 5,790,883 | 8/1998 | Sugita | 710/1 |
| 5,793,996 | 8/1998 | Childers et al. | 395/309 |
| 5,799,209 | 8/1998 | Chatter | 710/56 |
| 5,828,623 | 10/1998 | Dilbeck | 365/230.05 |
| 5,875,470 | 2/1999 | Dreibelbis et al. | 711/147 |
| 5,901,328 | 5/1999 | Ooe | 710/5 |

Primary Examiner—Ayaz R. Sheikh
Assistant Examiner—Raymond N Phan
Attorney, Agent, or Firm—Gray Cary Ware & Freidenrich

[57] ABSTRACT

An intelligent data bus interface using a triple-port memory having three independent data ports that provide simultaneous access to the data stored in the memory to two bi-directional data buses and to a data processor. The two data buses and the processor are coupled to separate data ports and each is able to independently access data in the triple-port memory at the full data rate of each. Because of the use of the triple-port memory, no data copying or moving is required in order to provide access to the data to the processor or the data buses. The intelligent data bus interface is particularly suitable for handling encryption/decryption, network protocol and PCI/SCI bridging at full speed at any of its ports without burdening a host processor.

30 Claims, 8 Drawing Sheets

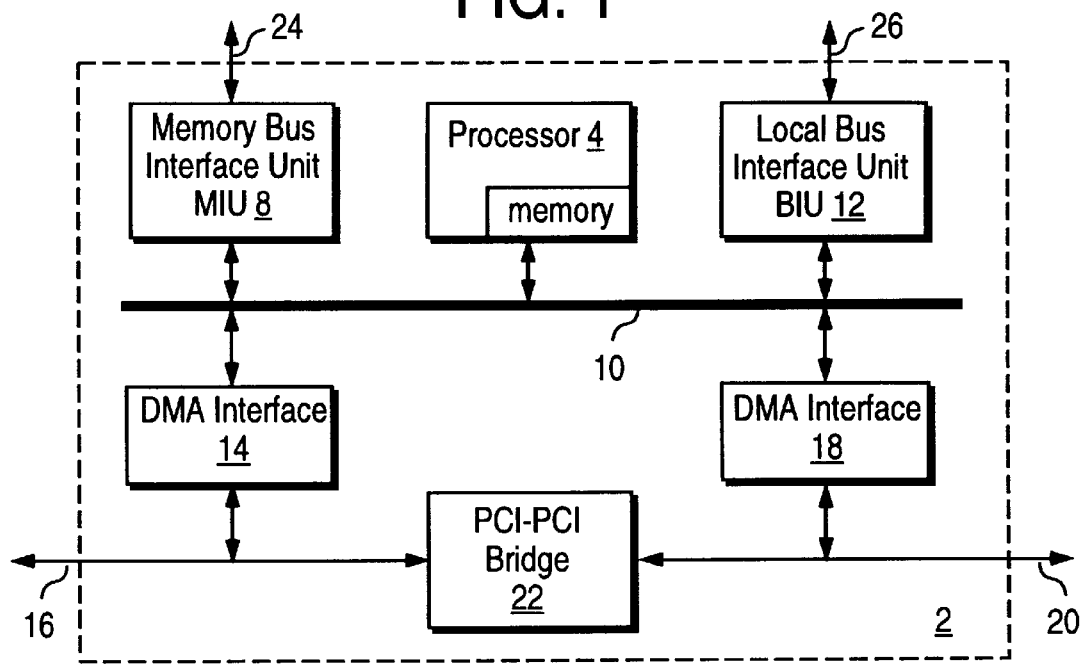
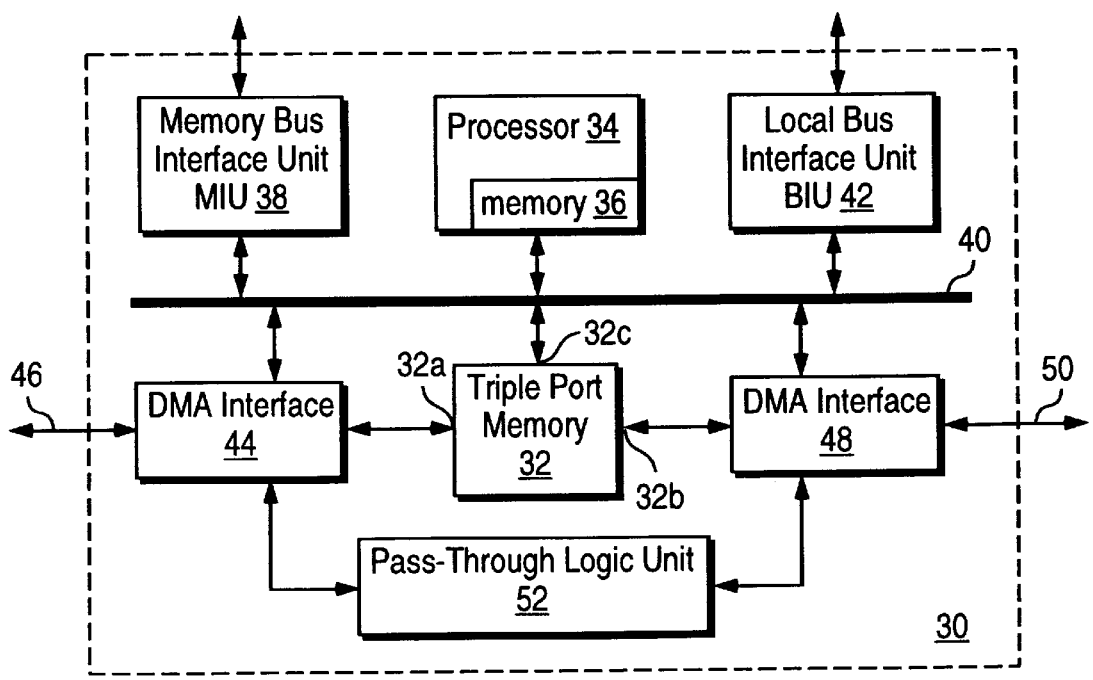

METHOD AND APPARATUS FOR ENABLING HIGH-PERFORMANCE INTELLIGENT I/O SUBSYSTEMS USING MULTI-PORT MEMORIES

BACKGROUND OF THE INVENTION

The present invention relates to intelligent data bus interface, and more particularly, to an intelligent data bus interface having a multi-port memory and a data processor.

A typical interface between the bus of a host computer and the bus of a slave computer or I/O device includes a dual-port memory having two independent bi-directional ports. The dual-port memory generally resides in an overlapping address space of both computers. Data is transferred between the computers by having one computer write to that computer's address space associated with the dual-port memory, and by having the other computer subsequently read the data from the other computer's address space associated with the dual-port memory. The dual port memory is particularly advantageous as an interface between a host bus and a slave bus which are operating at different data rates. The interface requires interrupt driven access to the central processing units (CPU) of the host computer and the slave computer for protocol, control, and for data processing functions. Each CPU is burdened by the interface interrupts which can demand a significant percentage of the CPU's processing power.

A typical intelligent interface has an input/output processor (IOP) that includes a dedicated microprocessor which allows the host computer's CPU to be relieved of many input/output (I/O) related tasks. Accordingly, higher I/O performance may be achieved while lowering the processing burden on the host CPU. In addition, the IOP may perform higher levels of the I/O protocol, carry out data conversions such as encryption/decryption, and execute intelligent runtime optimizations, like read-ahead caching and write-data merging.

An example of an existing intelligent data bus interface is disclosed as a network bridge 100 in U.S. Pat. No. 5,130,981 to Murphy. The term "intelligent" arises from a dedicated system processor 101 that is included in the network bridge. In the Murphy network bridge, a single-port random access memory (RAM) 102 is used to store data packets received by the network bridge from a first network 105 and from a second network 106 through first and second DMA controllers 103, 104, respectively. The system processor and the DMA controllers have access to the data packets stored in the RAM through a 3-port RAM interface which prevents the system processor or the DMA controllers from simultaneously accessing the single-port RAM. Ideally, the 3-port RAM interface 107 allocates the access to the single-port RAM so that the processor and the two DMA controllers have equal access priority to the single-port RAM. However, to provide equal access priority, the access cycle time of the RAM must be three times the access cycle time of the processor or the DMA controllers thus limiting the maximum bandwidth of the network bridge to about one-third of the RAM's bandwidth. The 3-port RAM interface gates access to the single-port RAM in a way that prevents simultaneous and asynchronous access by the processor and the DMA controllers to the single-port memory. Further, all data transfers and all requests between the two networks must occur through the RAM in the Murphy patent.

Generally, a host computer's and a slave computer's operating system must implement hardware specific functions to use an existing data bus or network interface.

Currently, standardization efforts for intelligent data bus interfaces are being directed toward de-coupling the operating system from the specific intelligent interface hardware by defining a standard intelligent interface protocol that is independent from the operating system. Therefore, intelligent interface hardware that implements the standard protocol is compliant with all operating systems supporting the standard protocol. Exemplary standards are the Intelligent I/O ($I_2O$) architecture, the Intel/Microsoft Virtual Interface (VI) Architecture, the Uniform Driver Interface, and the IEEE SCI Physical Layer API. The $I_2O$ standard specifically defines an intelligent I/O hardware architecture, byte transport protocols between a host CPU and an IOP, the transport driver interfaces, the message protocol, and the IOP initialization and configuration.

A currently available intelligent IOP 2, such as an Intel i960RP, is shown in FIG. 1 in a simplified form. The Intel IOP is positioned to operate within the $I_2O$ standard. The IOP includes a microprocessor (processor) 4 having an internal memory 6, a memory bus interface unit (MIU) 8, a local bus interface unit (BIU) 12, and two direct memory access (DMA) interfaces 14, 18. The processor, MIU, BIU and DMA interfaces are connected together by an internal bus 10. The IOP's large number of I/O interfaces allows it to act as an intelligent I/O bridge, as well as to perform initialization and control functions for the bus interface. The IOP's primary DMA interface 14 is typically connected to a host CPU (not shown) via the host's local peripheral component interconnect (PCI) bus 16. A secondary DMA interface 18 is connected to the network hardware (not shown) via a second PCI bus 20. A PCI-PCI bridge 22 allows DMA data exchange between the PCI buses 16, 20 without using the IOP or reducing the throughput at either bus. The IOP's microprocessor uses the internal bus 10 to connect the MIU 8, to the BIU 12, and to the two DMA interfaces 14, 18.

In a typical I/O operation, the IOP 2 receives a request that is posted to a specific address in its on-chip internal memory 6. The processor 4 subsequently decodes the request and responds by configuring an appropriate network interface (not shown) using the PCI bus 20. The network interface performs the request and copies the resulting data to/from the host computer's memory, using the PCI-PCI bridge 22. After completion of the DMA transaction, the IOP 2 receives an appropriate interrupt, which triggers a completion operation for the request.

Performance limitations resulting from the architecture of the IOP 2 are evident when additional I/O data processing is required, such as data encryption/decryption, packet-by-packet packet flow control, or implementation of higher protocol layers in the intelligent network interface. For such I/O data processing, the processor 4 must have direct access to the data stream. The CPU's access to the data stream can be done using several techniques, of which two are outlined below.

In a first technique, the processor 4 performs programmed I/O reads directly from internal elasticity buffers of the network interface using the PCI bus 20 processes the data internally and, using the host PCI bus 16, writes the data directly to the target memory in the primary PCI address space. Unfortunately, during such programmed I/O, at either of the two DMA interfaces 14, 18, any access latency may substantially slow the processor 4 thus reducing its processing efficiency. Further, the total available bandwidth through the IOP is limited to one half the bandwidth of the internal bus 10 minus any processor program code fetches (program cache misses) and access latencies or stalls at either of the two DMA interfaces 14, 18.

In a second technique, the PCI bus access latencies may be avoided by utilizing DMA engines in the two interfaces 14, 18 for moving data to and from the local memory (not shown) via the MIU 8 through a local memory bus 24. The local memory acts as an elasticity buffer for any I/O processing. The high-speed internal memory 6 also may be an elasticity buffer for avoiding PCI bus latencies. The internal memory 6 is typically small, e.g., 1 Kbyte, which requires a tight coupling between the sender and receiver of data packets. Using the internal memory 6, the total available bandwidth is limited to one half the bandwidth of bus 10, less any code fetches by the processor 4. The access latency to either of the PCI buses is amortized over larger data bursts and can be neglected. However, in the event that the internal memory 6 is too small and the local memory (not shown) is used, the total data throughput is limited to ¼ the bandwidth of internal bus 10, minus the bandwidth required for any code fetches.

As the bandwidth limitations of two techniques described above indicate, the architecture of the existing IOP 2 is advantageous if the IOP is performing schedule and control operations. However, if the IOP is required to access a high-speed data stream, its performance is more limited due to the inherent bandwidth constraints of its architecture.

Accordingly, there exists a definite need for an intelligent data bus interface having an internal processor that can access and operate on a high-speed data stream without unduly affecting the stream's data rate through the interface. Further, there exists a need for an intelligent data bus interface that can bridge data across the interface without requiring the interface to have a super-high speed internal data bus that must operate at a bandwidth that is many times larger than the bandwidth of a high-speed data stream. The present invention satisfies these needs and provides further related advantages.

SUMMARY OF THE INVENTION

The present invention is embodied in an intelligent data bus interface, and related method, for providing flexible and efficient data interfaces. The intelligent data bus interface includes a multi-port memory, a first bi-directional data bus, a second bi-directional data bus, and a processor. The multi-port memory has a plurality of data storage cells and has at least three independent bi-directional data ports that are configured to simultaneously and asynchronously write to and read data from the plurality of data storage cells. The first bi-directional data bus is coupled to a first port of the bi-directional data ports. The second bi-directional data bus is coupled to a second port of the bi-directional data ports. The processor is coupled to a third port of the bi-directional data ports and operates on data in the plurality of data storage cells. The intelligent data bus interface, by using a multi-port memory, allows each bi-directional data bus to independently operate at its full bandwidth data rate while providing data stream processing by the processor.

In a more detailed feature of the invention, the intelligent data bus interface further includes a first data bus interface unit coupled between the first bi-directional data bus and the first bi-directional data port, a second data bus interface unit coupled between the second bi-directional data bus and the second bi-directional data port. The first and second data bus interface units asynchronously write data to and read data from the plurality of data storage cells. The processor asynchronously operates on data previously written by one of the first and second data bus interfaces in one portion of the plurality of data storage cells while the first and second bus interfaces simultaneously write data to and read data from other portions, respectively, of the plurality of data storage cells. Also, the intelligent data bus interface may include a pass-through logic unit coupled between the first and second bus interface units for providing a data bridge between the first and second data buses. Additionally, the first data bus may be a PCI data bus, the first data bus interface unit may be a PCI interface unit, the second data bus may be an SCI data bus, and the second data bus interface may be an SCI interface unit. The pass-through logic unit may translate a data address on the SCI data bus to a data address on the PCI data bus for providing an SCI-to-PCI data bus bridge. The pass-through logic unit may also translate a data address on the PCI data bus to a data address on the SCI data bus for providing a PCI-to-SCI data bus bridge. Further, an internal bus may be coupled between the processor and the PCI interface unit.

In other more detailed features of the invention, the SCI data bus may use a 64-bit data address, the PCI data bus may use a 32-bit data address, and the multi-port memory may be a triple-port memory that uses a quad-port memory having two of its four ports configured to form the second bi-directional data bus that is coupled to the SCI data bus. Further, the pass-through logic unit may implement a fly-by address translation between the SCI bus interface unit and the PCI bus interface unit. Also, the data bridge may perform a protocol conversion between a split transaction protocol and an unified transaction protocol. Alternatively, the processor may schedule block reads between the first and second data bus interfaces to implement a chain-mode DMA.

In other more detailed features of the invention, the first data bus may be a host PCI data bus, with the first data bus interface unit being a first DMA interface unit, the second data bus may be a slave PCI data bus, with the second data bus interface unit being a second DMA interface unit, and the pass-through logic unit accordingly forwards a data address on the host PCI data bus to the slave PCI data bus and forwards a data address on the slave PCI data bus to the host PCI data bus to provide a PCI-to-PCI bridge unit. Alternatively, a third bi-directional data bus, such as an ATM bus, may be coupled to a fourth port of the at least three bi-directional data ports, by an ATM interface, the first data bus may be an Ethernet data bus, with the first data bus interface unit being a first Ethernet interface unit, the second data bus may be an Ethernet data bus, with the second data bus interface unit being a second Ethernet interface unit, and the pass-through logic unit may provide a data bridge between the first and second Ethernet buses. Also, an internal bus may be coupled to the processor, to the first data bus interface unit, and to the second data bus interface unit for enabling communication of control and configuration instructions among the processor and the first and second data bus interface units.

In yet other more detailed features of the invention, the processor performs encryption and decryption on data stored in the multi-port memory. Further, the processor may be a digital state machine or a data manipulation state machine for data encryption and decryption. The processor may include local memory for implementing a reflective memory protocol a memory cache. Additionally, a second processor may be coupled to a fourth port of the at least three bi-directional data ports. Also, a host bus interface may be connected to a port of the multi-port memory.

An alternative embodiment of the present invention is an interface that includes a processor, first bus interface for receiving data from and transmitting data to a first data bus, a second bus interface for receiving data from and transmitting data to a second data bus, and a triple port memory having first, second, and third ports for storing data into a plurality of storage cells and for reading stored data from the storage cells. The first port is coupled to the first bus interface such that data received from the first data bus is stored in the storage cells and data read from the storage cells by the first bus interface is transmitted to the first data bus. The second port is coupled to the second bus interface such that data received from the second data bus is stored in the storage cells and data read from the storage cells by the second bus interface is transmitted to the second data bus. The processor is coupled to the third port for reading, processing, and storing data in the storage cells and the data stored to a particular storage cell through a particular port is available to be read by another port independent of the particular port and while the particular port is reading data from or storing data to another storage cell.

The present invention is also embodied in a method for interfacing data. The method includes providing a multi-port memory having a plurality of data storage cells, storing data received through a first port from a first data bus into a first portion of the plurality of storage cells, and processing through a second port the data stored in the first portion of the plurality of data storage cells while independently and simultaneously storing data being received through the first port from the first data bus into a second portion of the plurality of storage cells.

As a more detailed feature of the invention, the method further includes reading, through a third data port, processed data stored in the first portion of the plurality of data storage cells while independently and simultaneously processing, through the second port, the data stored in the second portion of the plurality of data storage cells and while independently and simultaneously storing data being received through the first port from the first data bus into a third portion of the plurality of storage cells.

BRIEF DESCRIPTION OF THE DRAWINGS

FIG. 1 is a simplified block diagram of an intelligent I/O processor of the prior art.

FIG. 2 is a block diagram of a first embodiment of an intelligent data bus interface, in accordance with the invention, having a triple-port memory for operating between two PCI buses.

DETAILED DESCRIPTION OF THE PREFERRED EMBODIMENTS

Figure 3:
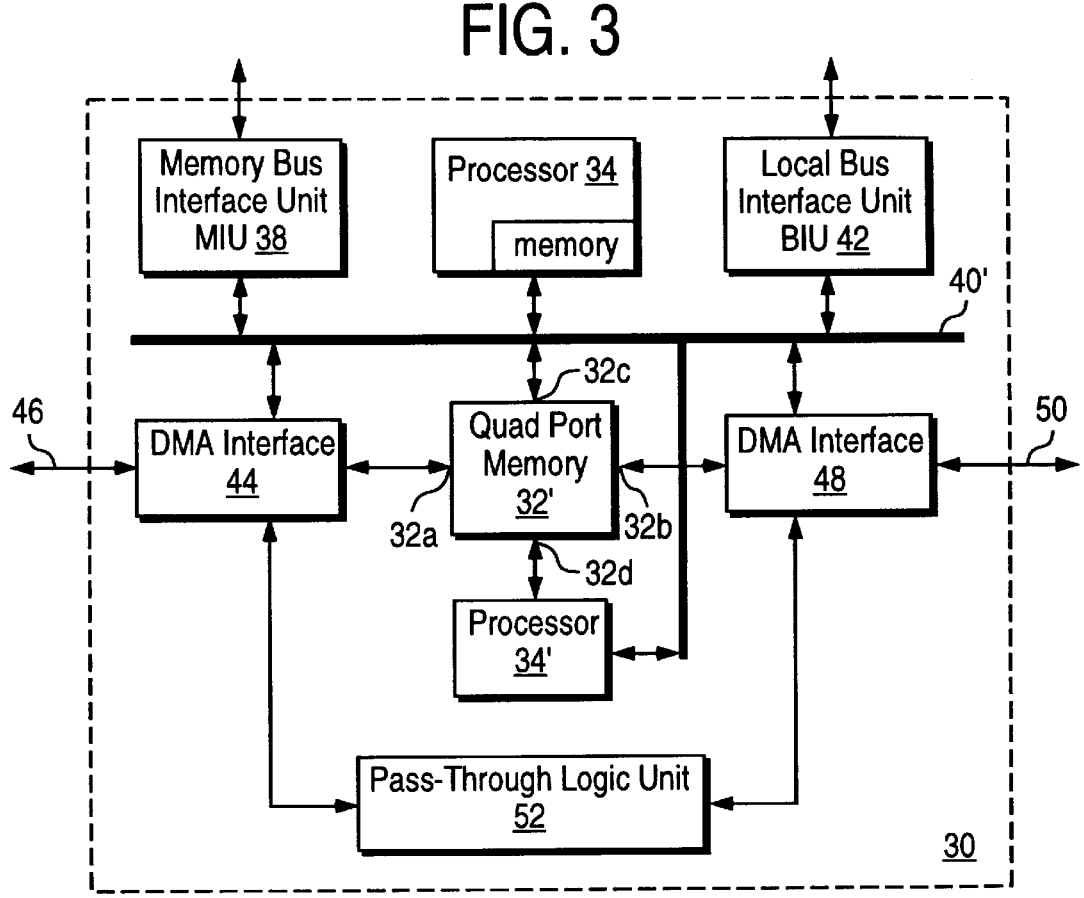
FIG. 3 is a block diagram of a second embodiment of an intelligent data bus interface, in accordance with the invention, having a quad-port memory and two processors for operating between first and second network buses.

With reference now to FIG. 2, there is shown an intelligent data bus interface 30 in accordance with a first embodiment of the invention. The bus interface 30 may be somewhat similar to the IOP 2 of FIG. 1, but further includes a multi-port memory 32, such as a triple-port memory, and a pass-through logic unit 52. The interface includes a processor 34, with internal processor memory 36, and includes two external bus interfaces 44, 48 associated with first and second data buses 46, 50, respectively. Each data bus 46, 50 is coupled to a bi-directional data port 32a, 32b of the triple-port memory through the respective bus interface 44, 48 which is capable of receiving and transmitting data packets to and from specified buffer storage cells in the triple-port memory. The processor 34 is coupled to a third bi-directional data port 32c of the triple-port memory. A particular advantage of the intelligent data bus interface, in accordance with the invention, is that each bi-directional data port can independently send or receive data at a data rate up to its full access speed without synchronizing with or waiting for the other data ports.

The processor 34 is coupled to the third port 32c of the triple-port memory 32 and to the DMA interfaces 44, 48 by an internal bus 40. Because the processor has access to the data of both data buses 46, 50 through the third port of the triple-port memory, it may operate on data residing in the triple-port memory at a rate independent of the data rate of either data bus 46, 50 and without interrupting full speed data transfer between either data bus and the triple-port memory. Therefore, the processor is able to modify a buffer slot or segment of storage cells in the triple-port memory, while a second buffer or segment of storage cells is being written to by a first bus interface and while data from a third buffer or segment of storage cells is being read by a second bus interface. Thus, the data buses 46, 50 may operate at full speed and are completely independent of the processor 34. If additional processing performance is necessary to service a high-speed data stream, additional ports may be added to the triple-port memory, forming a multi-port memory, with additional processors connected to the additional ports.

The intelligent data bus interface 30 of the present invention may further include a memory bus interface unit (MIU) 38 and a local bus interface unit (BIU) 42 which may be functionally similar to the MIU 8 and the BIU 12 of FIG. 1. Through a dedicated port 32c of the multi-port memory 32, the processor 34 has direct access to all data passing through the two bus interfaces 44, 48. The processor is the master of the internal bus 40, therefore, there is no access latency or other bus contention when the processor accesses the multi-port memory port through the internal bus. As a result, the total available data conversion bandwidth through the interface 30 is one-half the bandwidth of the total internal processor's multi-port memory port, determined by the speed of the internal bus 40, less the bandwidth required for any processor program code fetches (program cache misses). The bandwidth of the internal bus may be readily increased by increasing its width sufficient to be twice the bandwidth of the fastest external bus. The processor may also have direct access to either bus interface 44, 48 through the internal bus for initializing and configuring the bus interfaces.

The two ports of the multi-port memory 32 which are connected to two bus interfaces 44, 48 can receive or transmit data packets at data rates up to the bandwidth of the memory. The bus interfaces may be configured to have a similar function to the PCI-PCI bridge 22 in FIG. 1 using the pass-through logic unit 52, in combination with the multi-port memory 32, to implement forwarding of data packets in a "pass-through" fashion without having the processor 34 access the data. The pass-through logic unit 52 may selectively act on the data packets in a packet-by-packet manner and, thus, implement a filtering function. A decision to forward a given data packet occurs when the packet is being received at either of the bus interfaces, without routing the packet through the processor. The pass-through logic unit may be a state machine that is configured by the processor and that intercepts trivial acknowledgment packets or bypasses particular data packets, thus relieving the processor 34 from the task of processing trivial packets. The pass-through logic unit implements a selected level of packet handling associated with interfacing with unified transaction buses split-transaction buses and networks, such as PCI, SBUS, SCI, SerialExpress, ATM, or Ethernet.

The processor 34 has unrestricted direct access to any part of the data stream allowing both, protocol-conversion and bandwidth-conversion between different buses. The processor may perform complex data manipulations on any part of the data stream without affecting any of the bus interfaces. Thus, the processor may efficiently absorb lower network protocol layers to decrease the processing load of the host processor. The penalty for packet processing by the processor is added latency in the intelligent data bus interface. This latency, however, is much smaller than any latency imposed by the host CPU performing the same task.

For simplicity, the intelligent data bus interface 30 shown in FIG. 2 uses a triple-port memory 32. The invention, however, is not limited to a triple port memory. For example, as shown in FIG. 3, a quad-port memory 32' may be used to support an additional processor 34', such as a hardware encryption/decryption engine, that is connected to the memory's fourth port 32d. The additional processor may lower the bandwidth required for an internal bus 40'.

Figure 4:
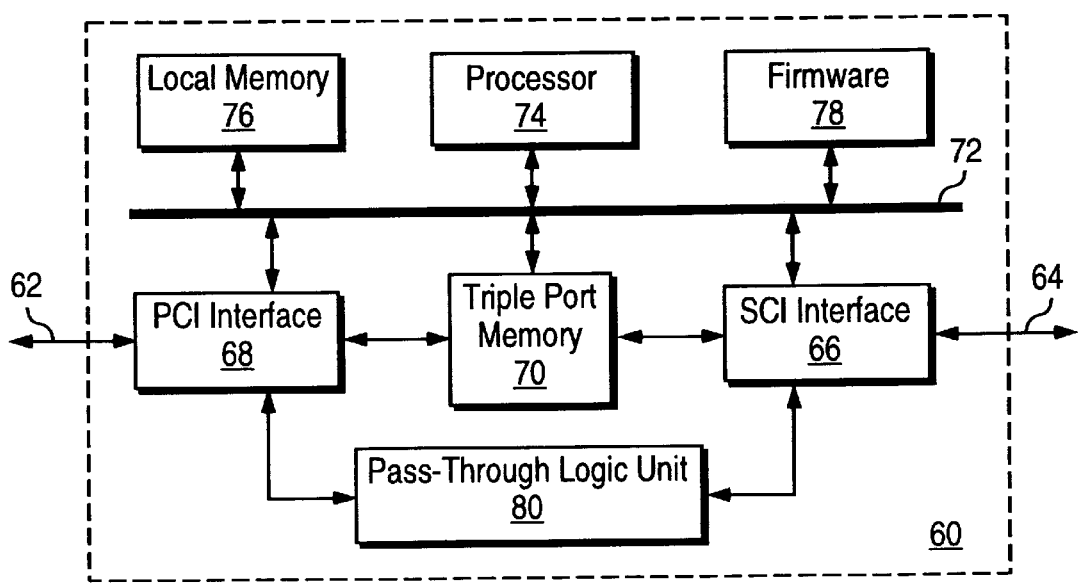
FIG. 4 is a block diagram of a third embodiment of an intelligent data bus interface, in accordance with the invention, for operating between a PCI bus and an SCI bus.

Another embodiment of the intelligent bus interface using a multi-port memory 70 may reside in an SCI-PCI bridge 60 as shown in FIG. 4. The bridge interfaces a PCI bus 62, often characterized as a unified-transaction bus, and a SCI bus 64, commonly characterized as a split-transaction network. SCI packets received at an SCI-interface 66 may be read-ahead cache lines and, therefore, may need to be stored inside an elasticity buffer in a triple-port memory 70. The bridge also includes a PCI interface 68 coupled between the triple-port memory 70 and the PCI bus 62. The two data buses, 62 and 64, may operate asynchronously, i.e., at different data rates.

Using commercially available multi-port memories, the intelligent multi-port memory bridge 60 may be implemented using commercial-off-the-shelf (COTS) chips, thus avoiding more expensive application specific integrated circuit (ASIC) designs. The various logic parts of the design could also be combined into a single ASIC for reduced high volume production costs. The SCI-PCI bridge 60 is shown in FIG. 4 as a board-level device rather than a chip device. An internal bus 72 connects a processor 74 with its local memory 76, firmware 78, such as a read only memory (ROM), and a triple-port memory 70. The processor is a COTS micro-controller. The processor has direct access to the local PCI bus interface 68 for initialization, configuration and special cycles, such as read-modify, write-transactions. The direct PCI access path may also be used to implement a reflective memory region in the local memory 76. The processor may be used to implement a synchronization protocol for the reflective memory with all other mapped remote reflective memories, using the SCI network. In this scenario the local PCI host can directly read from the reflective local memory 76.

Both the SCI interfaces 66 and the PCI interface 68 may implement similar dual functionality enabling them to receive and transmit data. The master functionality of the bus interface 60 is the ability to transmit a given data packet across the interface. For the SCI interface 66, a data packet residing in the triple-port memory 70 is sent to the network, while for the PCI interface 68, a data packet residing in the triple-port memory is written to or read from a specified PCI address.

The SCI interface 66 receives data and stores it in an available elasticity buffer. As readily known to one skilled in the art, an elasticity buffer may be implemented using free buffer lists or availability lookup tables. The buffer resource management method selected is not important for the present invention. Further incoming requests are blocked if no free buffers are available. The SCI interface also monitors the data in order to determine if a given packet needs to be handled by the processor 74 or by a pass-through logic unit 80.

Because the PCI bus 62 is a unified transaction bus, the PCI interface 68 is more complex. For write transactions, the data is stored in available buffers. If the PCI data burst size exceeds a block size of 64 or 256 bytes, multiple write bursts will be produced. If all of the write buffers are full, the PCI interface issues retries until at least one buffer is freed. For each PCI data burst produced, the PCI interface 68 notifies the processor 74, using an existing method such as message queues, of the pending request. The processor then performs any necessary reformatting and address translation. After successful completion of the write-packet processing, the processor schedules the packet for transmission to the SCI network interface.

For PCI read transactions, an internal address map defines whether the particular read selects the reflective memory region, which is part of the local memory 76, or if a transparent read is to be executed. For accesses to the local reflective memory 76, the local bus 72 is arbitrated and the appropriate read transaction executed. For transparent reads, the read address is written as read-request to the triple-port memory 70 and the processor is notified. The processor checks to determine whether the requested read-data is available in any of the local caches. If the requested data is not cached, an appropriate SCI read-request is generated. If the given attributes permit read-ahead caching, a 64- or 256-byte read transaction is generated, covering the requested word. The overhead cost for reading 64 bytes instead of one word is small.

There may be two cache layers implemented in this architecture. The first cache layer is the triple-port memory 70. Additional read transactions to adjacent addresses can be honored immediately after the first SCI read has been completed. The second cache layer is implemented in the local memory 76. Before purging a read-data packet from the triple-port memory 70, after the completed read transaction, the processor 74 may copy it to reserved regions of the local memory 76 which is acting as secondary cache. In the event of additional read transactions to this cache line, locally cached data can be copied back as if it was received from a remote node, but with less latency. Copy transactions between the triple-port memory 70 and the local memory 76 are executed, as well known in the art, as fly-by transactions, requiring only one clock cycle per data word. Each valid read-data buffer in the triple-port memory 70 is accommodated by a cache tag entry that allows the PCI read interface 68 to determine the availability and location of the cache line without processor intervention.

Write transactions to the reflective memory region are treated similar to writes to the SCI address domain. The processor 74 copies the write data to the reflective memory and generates the appropriate SCI write transactions, updating all other linked reflective memory segments. Incoming SCI writes to the reflective memory sub-address are copied to the appropriate reflective memory regions.

The processor 74 can configure the SCI interface 66 to forward particular data packet types to a pass-through logic unit 80 in order to relieve the processor 74 from processing trivial data packets. For example, posted write response success messages only free the appropriate buffer resource within the triple-port memory 70 and do not require processing by the processor. Another feature of the pass-through logic unit is the ability to process streaming block data. For long DMA bursts of data that do not require reformatting, such as asochronous video data, a basic DMA buffer type (typically 64 or 256 byte blocks) may be directly forwarded to the PCI interface 68. The pass-through logic unit 80 writes to the appropriate key address of the PCI interface 68, triggering the appropriate PCI burst. The processor 74 controls which packets are forwarded by the pass-through logic unit 80. The forwarding selection may depend on the packet type, source address and SCI sub-address. There may be multiple, simultaneous data streams, some of which bypass the processor, while others are processed by the processor.

The relevant portion of the SCI sub-address is snooped by the SCI slave interface 66 and forwarded to the PCI master interface 68. Provided that a properly formatted address translation table is stored in the triple-port memory, the PCI master interface 68 may perform the SCI-PCI address translation on-the-fly.

Figure 5:
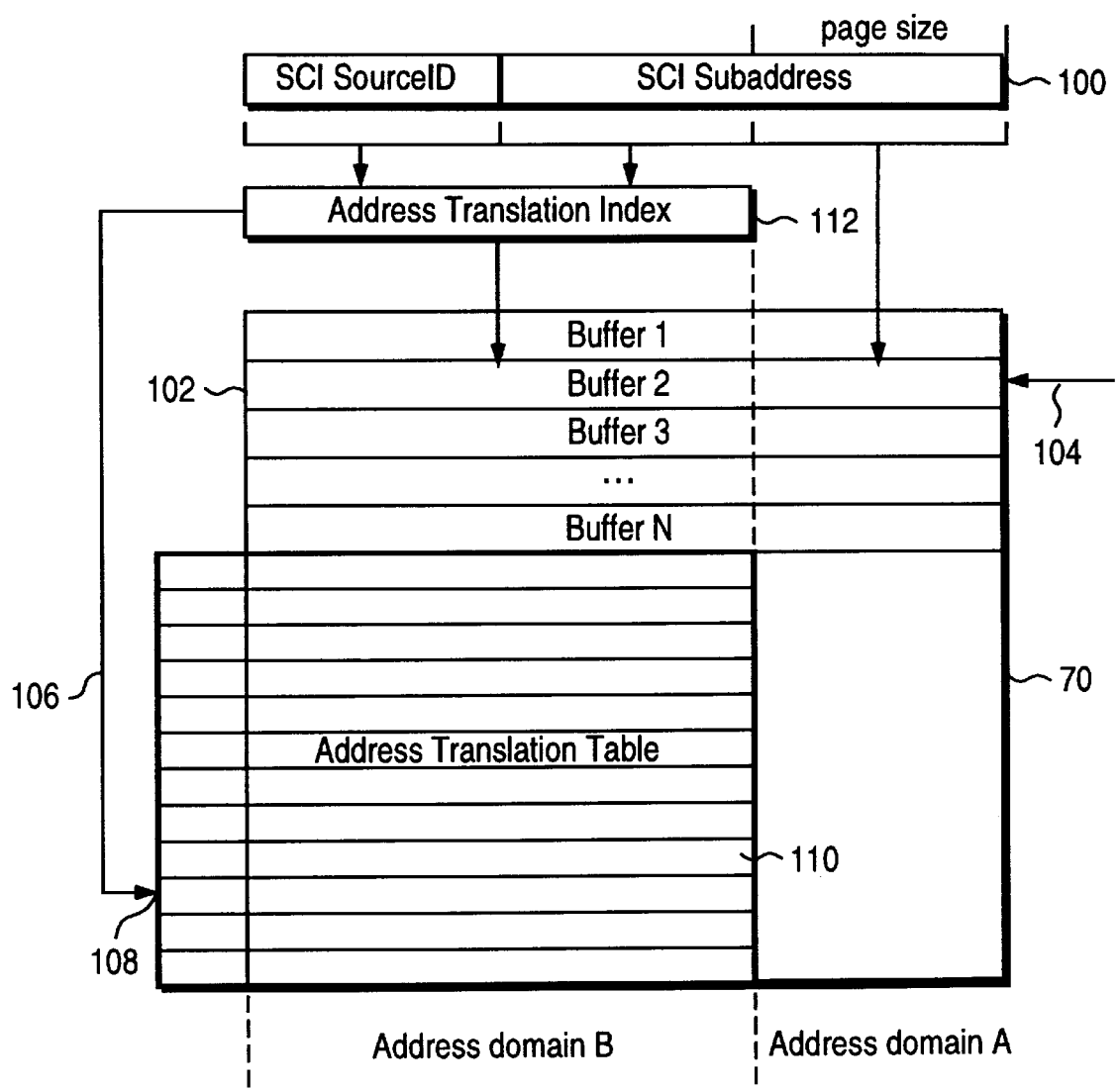
FIG. 5 is a schematic diagram of a fly-by address translation method, for use with the bus interface of FIG. 4, using an address translation table for converting addresses between the address domains of the SCI bus and the PCI bus.
Figure 6:
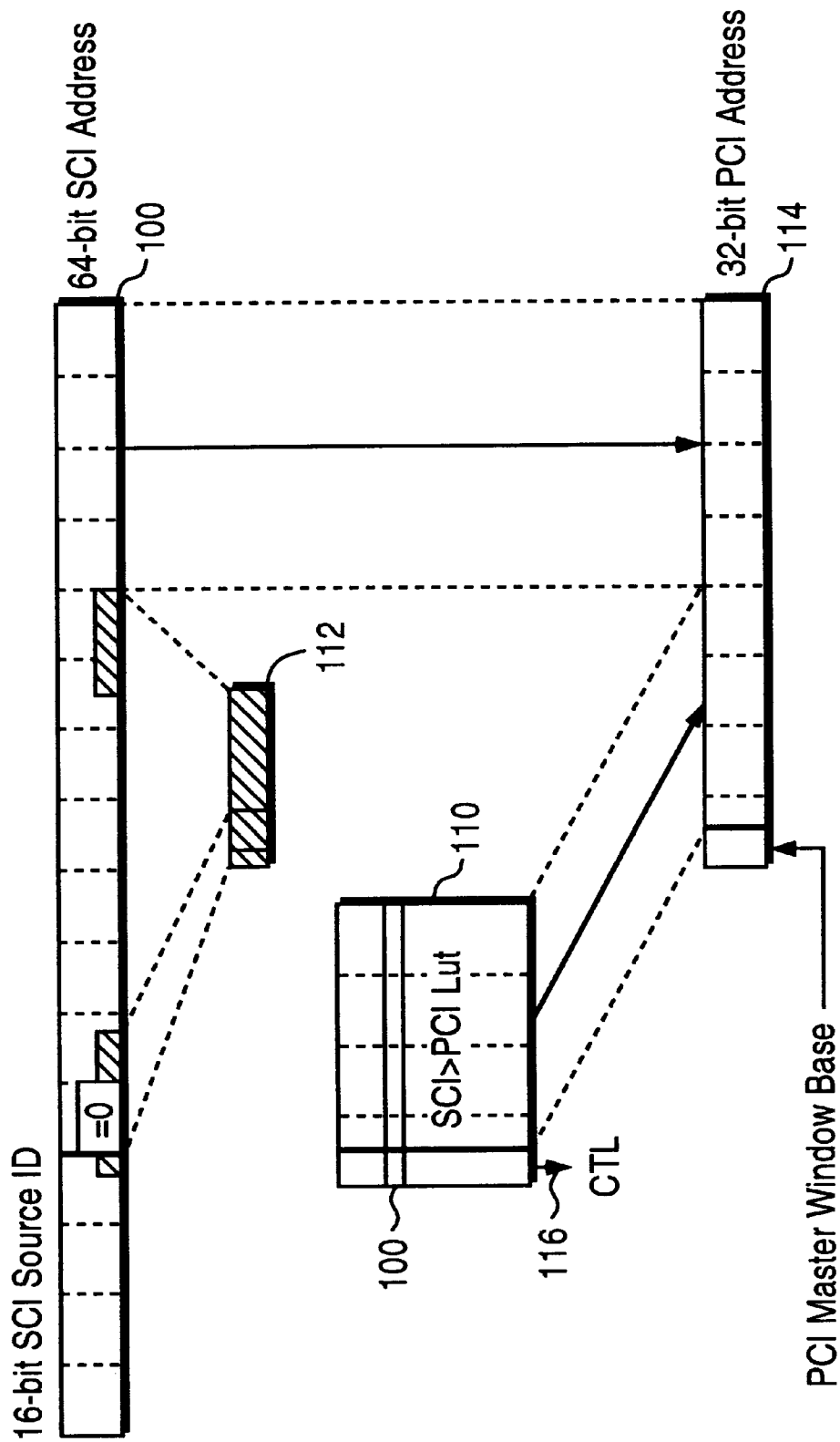
FIG. 6 is a data flow diagram of a method for converting a 64-bit SCI address to a 32-bit PCI address, in accordance with the fly-by address translation method of FIG. 5.
Figure 7:
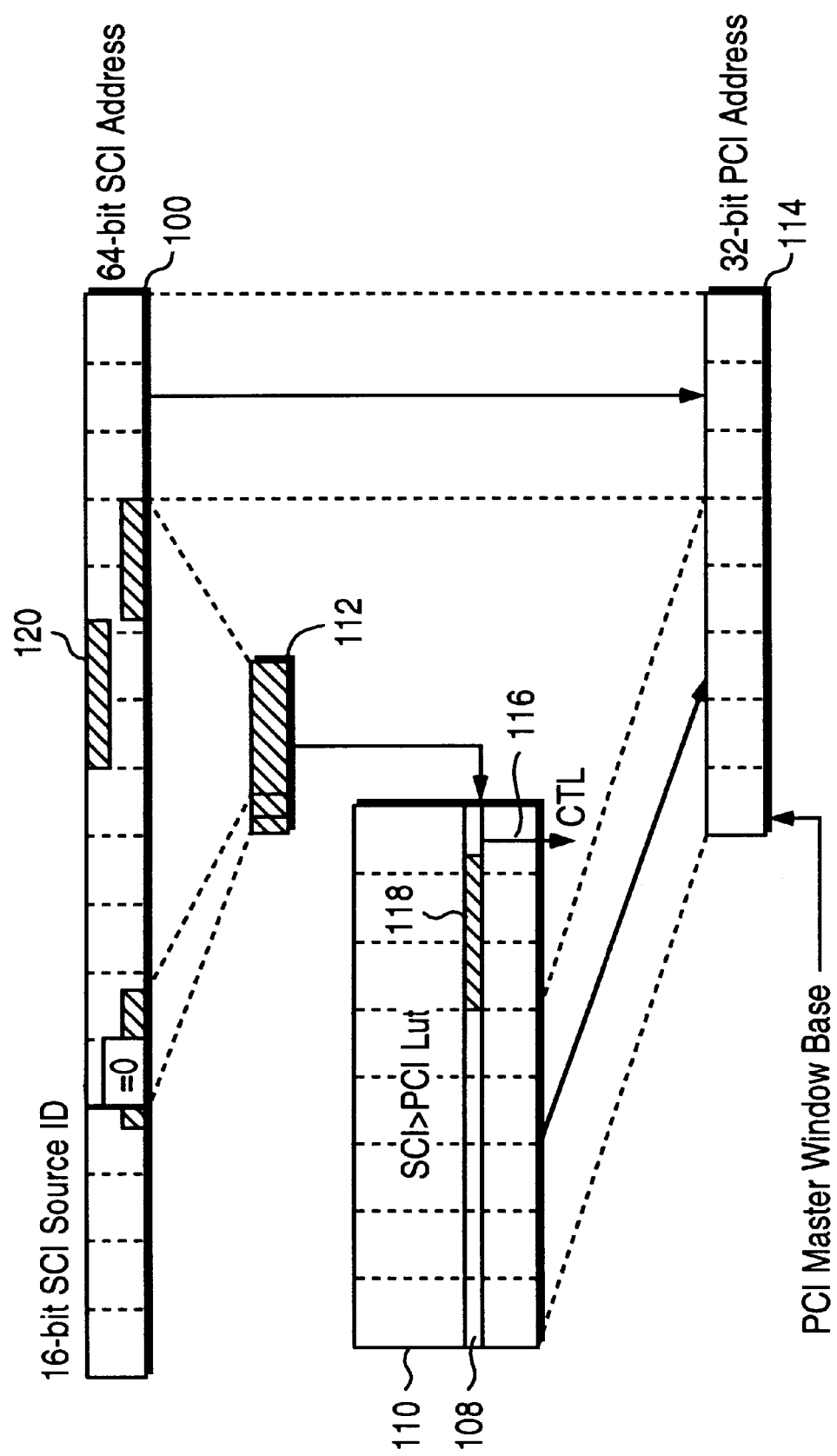
FIG. 7 is a data flow diagram of another method for converting a 64-bit SCI address to a PCI 32-bit address, in accordance with the fly-by address translation method of FIG. 5.

The SCI-PCI fly-by address translation method is shown in FIGS. 5–7. The method may be adapted to perform PCI-SCI address translations. The relevant upper bits of the SCI request address 100 are snooped by the SCI interface 66 of FIG. 4, while the address is written to a defined, static sub-address in an available buffer slot 102. The SCI Source ID may be used to define different address maps or privileges for different SCI hosts. Not all address bits shown in FIG. 5 need to be used. The PCI port of the triple-port memory 70 may be implemented as two data words with independent address buses, indicated in FIG. 5 as address domains A and B. Address domain A is equivalent to the page size of the host system, which is typically 4 Kbytes, thus requiring 12 addressing bits. During the address phase in the PCI interface 68, address domain A 104 carries the page sub-address, which is passed-through. The address bits of domain A are read from a location in the triple-port memory 70 defined by the base address of the receiving buffer 102 plus the appropriate static buffer offset of the address word. Address domain B 106 carries the translated address plus access options 108, such as the read-only attribute. In the event of an illegal access, such as a write to a read-only region, the transaction is terminated, resulting in an address-only phase. The address portion 106 is read from an address translation table entry 110. It is defined by the address translation table base address plus the address translation index 112, which was snooped by the SCI slave interface 66. The new address is assembled by simultaneously addressing different portions of the triple-port memory 70, using the forwarded prior knowledge of the appropriate buffer address and address translation index. The two sub-words of the multi-port memory PCI bus are easily implemented by taking into account that typical multi-port memories are available in widths of 8 or 16 bits per port. Therefore, a 32-bit PCI data bus can be assembled from a plurality of multi-port memory chips. Thus, by not busing all address bits of a given port together, multiple individually addressable data sub-words are created, which can be used to compile a translated address.

A more detailed description of the fly-by address translation method with external LUT is shown in FIG. 6. The 64-bit SCI address 100 and the 32-bit PCI address 114 are drawn to scale with each dashed region representing 4 bits. Of course, other address bit widths are possible and the present invention is not limited to a 64-bit SCI address or a 32-bit PCI address.

While the SCI interface 66 copies the incoming SCI request into its appropriate slot 102 in the multi port memory 70, it also snoops the address bits of the incoming request. In the present example, SCI address bits 48, 43–42 and 21–16 are used to form the 9-bit index 112 into the 16-bit SCI-to-PCI look-up table. The SCI-to-PCI look-up table index is compiled from three fields. The first index bit is the lowest bit of the SCI source ID. This bit provides a differentiation between two groups of SCI requesters with respect to their access privileges and windows. The next two index bits (SCI address bits 43–42) are used to allow up to four simultaneous windows of up to 4 MB in size. The lowest six index bits define up to 64 pages in the given window. Note in this embodiment, the SCI subaddress bits 47–44 are required to be zero in order for the pass-through-logic device 80 to accept and forward the request to the PCI interface 68.

The upper two bits from the look-up table define a 2-bit control field 116. The first bit of the control field 116 is used as a write protect bit and the second bit is used to control a byte swap engine of the PCI interface 68. This feature allows a page by page endianess conversion. The remaining fourteen bits from the lookup table form bits 16 through 29 of the PCI master address. The upper two PCI address bits are defined by a CSR register and define the PCI master base address. This grants a 1 GB PCI address window. The SCI-to-PCI LUT can be any memory size. If 512 address translation entries are not sufficient, a larger memory can be used, allowing a larger LUT index 112.

The SCI address is always written to a specific subaddress of an appropriate input buffer in the triple-port memory 70. Therefore, it is possible to address the triple-port memory such that its data outputs drive this address word. In this scenario, only the output enables corresponding to the lower 16 bits of the memory are enabled while the upper 16 bits are simultaneously supplied by the SCI-to-PCI LUT. The PCI master sequencer produces the appropriate address from the LUT index 112, which was forwarded to it using the pass-through logic unit 80.

The external look-up table memory can be absorbed into the triple-port memory 70 by reserving part of the triple-port memory for the look up table. The only change to the scenario above is that the PCI port of the triple-port memory must allow independent addressing of its most and least significant 16-bit port. In this scenario, the PCI local memory port has two independent address buses but one control bus.

A description of a fly-by address translation method with internal LUT and tag compare is shown in FIG. 7. This address translation method is driven by the page size of the operating system in use. A typical page size is 4 K bytes. Given the small page size and the limited number of address translation entries available in the small multi-port memory 70, the entries stored in the multi-port memory 70 are implemented as address translation cache entries. As before, selected bits of the SCI address are snooped and used to build the look-up table index 112. However, the address translation entry (ATE) 108 is 32 bits wide, part of which defines an ATE cache tag 118 that needs to match the appropriate SCI target address bits 120 in order for the entry to be valid. These SCI target address bits 120 can be snooped by the SCI interface 66 and forwarded to the PCI interface 68 in a manner similar to the address translation index field 112. They can also be read from the PCI port of the multi-port memory 70.

The final PCI address is then compiled from data bits 0–11 of the incoming buffer slots SCI target address offset and bits 12–31 of the appropriate matching address translation entry. This is done during the cycle following the reading of the ATE in which the address tags are compared. During the PCI address phase, the second 8-bit port (D8–15) of the multi-port memory 70 is disabled and the PCI interface 68 drives the previously read/snooped address bits appropriately.

Note that PCI-to-SCI address translation is similarly implemented. Also, in a more complex embodiment, one data port may have multiple address buses. Such an implementation expands the methods described above.

Figure 8:
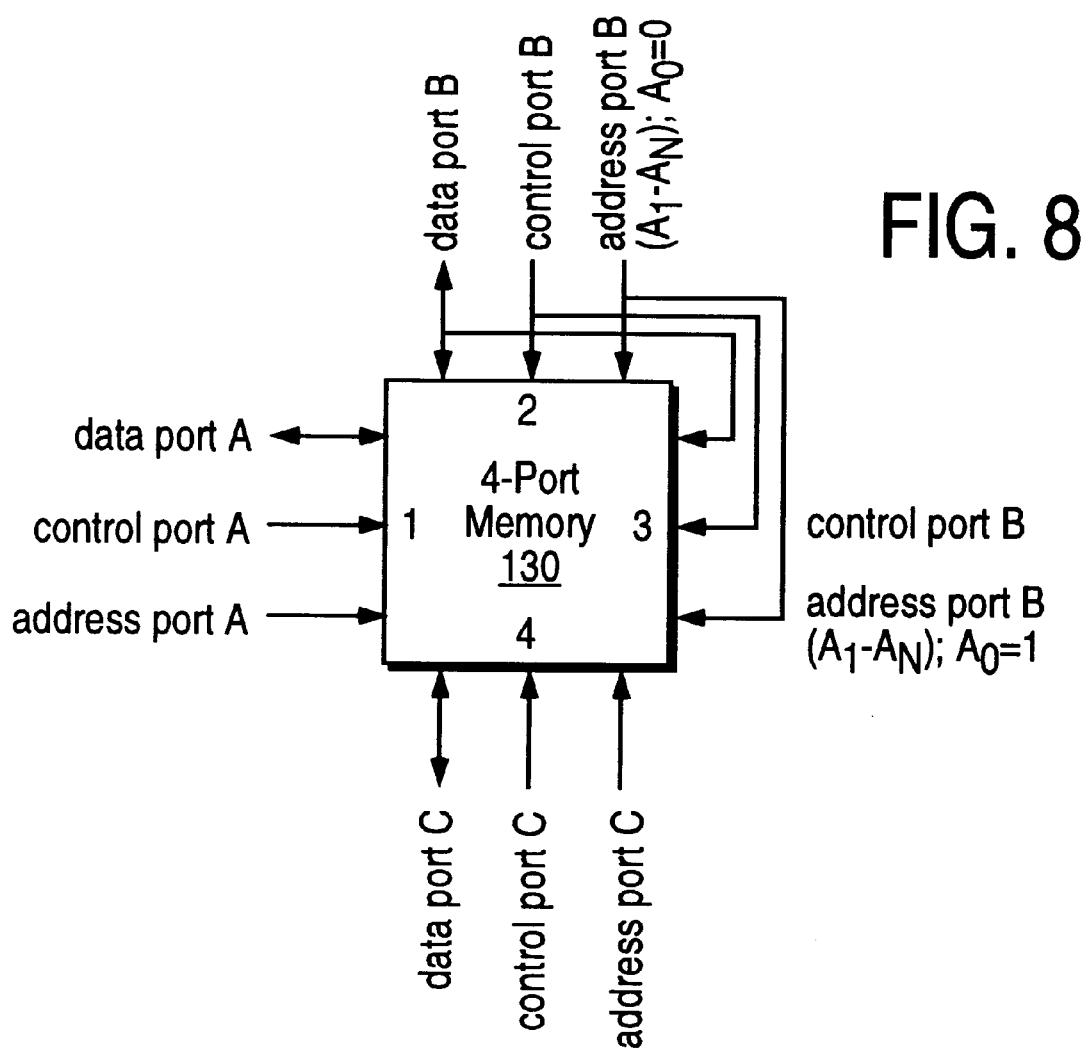
FIG. 8 is a schematic diagram of a triple-port memory formed from a quad-port memory, in accordance with the invention, having two n-bit wide data buses and one 2n-bit wide data bus.

A memory map of the triple-port memory 70 as seen by the microcontroller 74 or by the PCI local bus 62 for the above method may be implemented in accordance with Table 1 below.

memories. However, only one memory chip is required to build a triple-port memory 70, using a quad-port memory 130, as shown in FIG. 8. The quad-port memory has four 8-bit data buses. Therefore, four chips need to be combined to form a 32-bit bus. The SCI backend bus interface is typically 64 bits wide. In order to avoid using eight 8-bit multi-port memories to build a 64-bit bus, two data ports can be combined to form a 64-bit bus. The lowest address bit of the merged 64-bit bus is tied to a fixed level (low for port 2 and high for port 3). Which address bit is tied to which level depends on the IOP bus interface's endianess flavor and the organization of data bus B. If a 64-bit write transaction is executed, the quad-port memory recognizes two simultaneous write requests at two ports to two adjacent memory locations with identical timing. This demonstrates how the interface of the present invention can accommodate various bus widths, without requiring specially designed chips. All ports of the multi-port memory operate asynchronously allowing independent clock domains at each port. Another utilization of a quad-port memory is to use the fourth port as either an additional network port or allow addition of a second processor 74' if one processor 74 proves insufficient.

Figure 9:
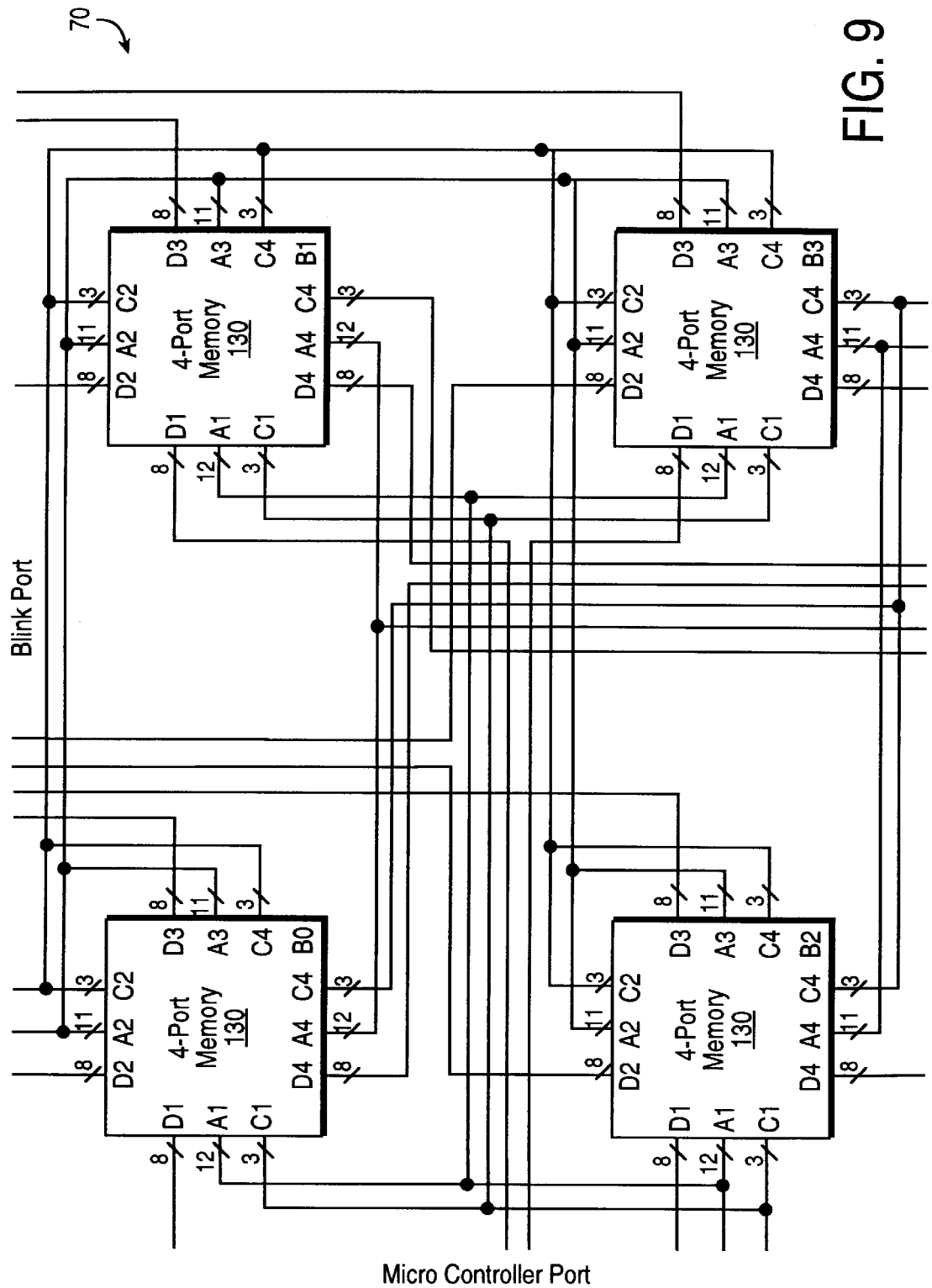
FIG. 9 is a schematic diagram of four quad port memories configured to form a triple-port memory, in accordance with the triple-port memory of FIG. 8, having a 32-bit PCI bus and a 64-bit SCI bus.

The configuration of a triple-port memory 70 using a quad-port memory 130 is shown in more detail in FIG. 9. The Blink address bus is 11 bits wide because the lowest address pin is tied to GND or VCC, respectively (A2(0)<= '0'; A3(0)<='1' or vice versa, for all chips depending on the endianess of the involved buses). The PCI local bus chip B1 is asymmetric with the chip driving D8–D15, which contains part of the pass through address and part ATE address bits. Other groupings of the output enable signals and maybe the address buses are obviously possible depending on the specific fly-by address translation scheme.

Figure 10:
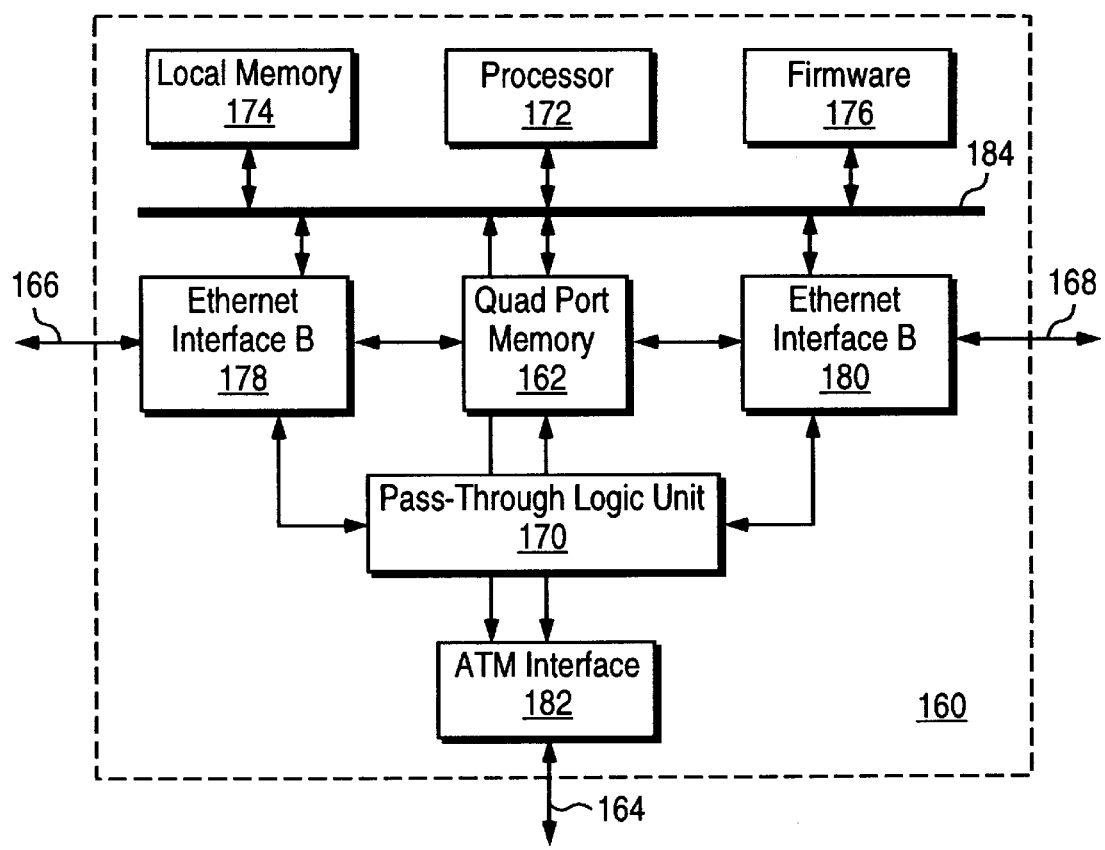
FIG. 10 is a block diagram of an intelligent network router, based on a quad-port memory in accordance with the present invention, for interfacing between two Ethernet networks and an ATM network.

FIG. 10 shows the architecture of an intelligent network router 60 based on a quad-port memory 162 in accordance with the present invention. The example chosen is a LAN/WAN fire wall implementing, for example, a 155 Mbit ATM link 164 plus two independent 100 megabit Ethernet LAN links 166, 168. It can also function as an Ethernet bridge

TABLE 1

TPM memory layout

| Relative Address Offset | Content |  |  |  |
|---|---|---|---|---|
|  | 31 | 23 | 15 | 7 |
| 0000h . . . 05FCh | 384 SCI→PCI access control/address translation table entries (SCIPCILUT) |  |  | 384 SCI→PCI access control/address translation table tags (SCIPCILUT)   CFG |
| 0600h . . . 06FCh | 64 PCI read data buffer descriptor |  |  |  |
| 0700h . . . 07FCh | 16 × 16-byte send buffer slots<br>This buffer is maintained by the PCI slave read sequencer.<br>It is used for storing PCI direct read requests. |  |  |  |
| 0800h . . . 0FFCh | 16 × 128-byte send buffer slots (each holding up to 80-byte packets)<br>This buffer is maintained by the PCI slave write sequencer.<br>It is used for storing PCI direct write data. |  |  |  |
| 1000h . . . 1FFCh | 32 × 128-byte send buffer slots (each holding up to 80-byte packets)<br>This buffer pool is maintained by the I960 microcontroller.<br>DMA request, SCI response packets, and other packets are sent from here. |  |  |  |
| 2000h . . . 3FFCh | 64 × 128-byte receive buffer slots (each holding up to 80-byte packets)<br>This buffer pool is maintained by the Blink Receiver.<br>Any kind of incoming packet is stored here. |  |  |  |

The simplest multi-port memories currently available are either dual-port or quad-port memories. It is possible to implement a triple-port memory using three dual-port using the pass-through logic device 170. The processor 172, as in the previous embodiments, is supported by local memory 174 and firmware ROM 176, and using internal bus 184, has access to all network ports for configuration and control. All ATM traffic is routed through the quad-port memory 162, where all fire wall functionality and LAN/WAN protocol conversion is performed by the processor 172. The network interfaces 178, 180 and 182 shown in FIG. 10 are examples of possible data bus configuration. The invention, however, is not limited to any specific protocol or network standard.

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. An interface apparatus, comprising:

a multi-port memory having a plurality of data storage cells and having at least three independent bi-directional data ports that are configured to simultaneously and asynchronously write data to and read data from the plurality of data storage cells without allocation of access between the data ports and the plurality of data storage cells;

first means for coupling a first port of the bi-directional data ports to a first bi-directional data bus;

second means for coupling a second port of the bi-directional data ports to a second bi-directional data bus; and a processor coupled to a third port of the bi-directional data ports for operating on data in the plurality of data storage cells.

2. An interface apparatus as defined in claim 1, wherein:

the first data bus uses a n-data bits;

the second data bus uses a m data bits where m is greater than n; and the multi-port memory is a triple-port memory that uses a quad-port memory having one of its four ports configured for the first data bus and having two of its four ports configured for the second bus data bus for supporting the wider m-bits data address.

3. An interface apparatus as defined in claim 1, wherein:

the first coupling means includes a first data bus interface unit coupled between the first bi-directional data bus and the first bi-directional data port for asynchronously writing data to and reading data from the plurality of data storage cells;

the second coupling means includes a second data bus interface unit coupled between the second bi-directional data bus and the second bi-directional data port for asynchronously writing data to and reading data from the plurality of data storage cells; and the processor asynchronously operates on data previously written by one of the first and second data bus interfaces in a one portion of the plurality of data storage cells while the first and second bus interfaces simultaneously write data to and read data from other portions, respectively, of the plurality of data storage cells.

4. An interface apparatus as defined in claim 3, further comprising a pass-through logic unit coupled between the first and second bus interface units for providing a data bridge between the first and second data buses.

5. An interface apparatus as defined in claim 4, wherein the data bridge performs a protocol conversion between a split transaction protocol and an unified transaction protocol.

6. An interface apparatus as defined in claim 4, wherein:

the first data bus is a PCI data bus;

the first data bus interface unit is a PCI interface unit;

the second data bus is an SCI data bus;

the second data bus interface is an SCI interface unit; and the pass-through logic unit translates a data address on the SCI data bus to a data address on the PCI data bus for providing an SCI-to-PCI data bus bridge.

7. An interface apparatus as defined in claim 6, wherein the pass-through logic translates a data address on the PCI data bus to a data address on the SCI data bus for providing a PCI-to-SCI data bus bridge.

8. An interface apparatus as defined in claim 4, wherein:

the SCI data bus uses a 64-bit data address;

the PCI data bus uses a 32-bit data address; and the multi-port memory is a triple-port memory that uses a quad-port memory having one of its four ports configured for the PCI data bus and having two of its four ports configured for the SCI bus data bus for supporting the wider 64-bit data address.

9. An interface apparatus as defined in claim 8, wherein the pass-through logic unit implements a fly-by address translation between the SCI bus interface unit and the PCI bus interface unit.

10. An interface apparatus as defined in claim 3, wherein:

the first data bus is a host PCI data bus;

the first data bus interface unit is a first DMA interface unit;

the second data bus is a slave PCI data bus;

the second data bus interface unit is a second DMA interface unit; and the pass-through logic unit forwards a data address on the host PCI data bus to the slave PCI data bus and forwards a data address on the slave PCI data bus to the host PCI data bus to provide a PCI-to-PCI bridge unit.

11. An interface apparatus as defined in claim 3, wherein the processor schedules block reads between the first and second data bus interface units to implement a chain-mode DMA data transfer.

12. An interface apparatus as defined in claim 3, further comprising an internal bus that is coupled to the processor, to the first data bus interface unit, and to the second data bus interface unit for enabling communication of control and configuration instructions among the processor and the first and second data bus interface units.

13. An interface apparatus as defined in claim 1, further comprising third means for coupling a fourth port of the bi-directional data ports to a third bi-directional data bus.

14. An interface apparatus as defined in claim 13, wherein:

the third coupling means includes a third bi-directional data bus interface unit coupled to a fourth port of the bi-directional data ports; and the interface apparatus further comprises a pass-through logic unit coupled between the first and second bus interface units for providing a local network bridge between the first and second data buses.

15. An interface apparatus as defined in claim 14, wherein:

the first data bus is a first Ethernet data bus;

the first coupling means includes a first Ethernet interface unit;

the second data bus is a second Ethernet data bus;

the second coupling means includes a second Ethernet interface unit;

the third coupling means includes an ATM interface unit coupled between the third bi-directional data bus and the fourth bi-directional data port; and the pass-through logic unit provides a data bridge between the first and second Ethernet data buses.

16. An interface apparatus as defined in claim 1, wherein the processor includes means for performing encryption and decryption on data stored in the multi-port memory.

17. An interface apparatus as defined in claim 1, further comprising a second processor coupled to a fourth port of the bi-directional data ports for operating on data in the plurality of data storage cells.

18. An interface apparatus as defined in claim 1, wherein the processor is a digital state machine.

19. An interface apparatus as defined in claim 1, wherein the processor includes local memory for implementing a reflective memory protocol.

20. An interface apparatus as defined in claim 1, wherein the processor includes local memory for implementing a memory cache.

21. An interface apparatus, comprising:

a processor;

a first bus interface for receiving data from and transmitting data to a first data bus;

a second bus interface for receiving data from and transmitting data to a second data bus;

a triple port memory having first, second, and third ports for storing data into a plurality of storage cells and for reading stored data from the storage cells without allocation of access between the ports and the plurality of data storage cells;

the first port being coupled to the first bus interface such that data received from the first data bus is stored in the storage cells and data read from the storage cells by the first bus interface is transmitted to the first data bus;

the second port being coupled to the second bus interface such that data received from the second data bus is stored in the storage cells and data read from the storage cells by the second bus interface is transmitted to the second data bus;

the processor being coupled to the third port for reading, processing, and storing data in the storage cells; and wherein the data stored to a particular storage cell through a particular port is available to be asynchronously read by another port independently of the particular port while the particular port is reading data from or storing data to another storage cell.

22. An interface apparatus, comprising:

a multi-port memory having a at least four independent bi-directional data ports;

a plurality of bus interfaces, each interface being connected to one of a separate data port of the at least four independent data ports for storing data in and reading data from the multi-port memory; and a plurality of data processors, each data processor being connected to a separate data port of the at least four independent data ports for simultaneously reading data from different portions of the multi-port memory, processing the stored data, and storing the processed data in the multi-port memory without allocation of access by the at least four independent data ports to the multi-port memory during reading data from and storing data to the multi-port memory.

23. An interface apparatus as defined in claim 22, wherein each of the plurality of processors includes means for performing encryption and decryption on data stored in the multi-port memory.

24. An interface apparatus as defined in claim 22, further comprising an internal bus connected between the plurality of bus interfaces and the plurality of data processors for communicating control and configuration instructions between the plurality of data processors and the plurality of bus interfaces.

25. An interface apparatus as defined in claim 22, further comprising a pass-through logic device for transmitting data between two bus interfaces using the multi-port memory independent of the processor.

26. An interface apparatus as defined in claim 25, wherein the pass-through logic device implements a fly-by address translation between the two bus interfaces.

27. An interface apparatus as defined in claim 22, wherein the multi-port memory is a quad-port memory implementing a triple-port memory with different port data bus widths using a quad-port memory.

28. A method for interfacing data, comprising:

providing a multi-port memory having a plurality of data storage cells;

storing data received through a first port from a first data bus into a first portion of the plurality of storage cells;

processing, through a second port, the data stored in the first portion of the plurality of data storage cells while independently and simultaneously storing data being received through the first port from the first data bus into a second portion of the plurality of storage cells; and reading, through a third data port, processed data stored in the first portion of the plurality of data storage cells while independently and simultaneously processing, through the second port, the data stored in the second portion of the plurality of data storage cells and while independently and simultaneously storing data being received through the first port from the first data bus into a third portion of the plurality of storage cells.

29. An interface apparatus for interfacing data as defined in claim 3, wherein processed data stored in a portion of the plurality of data storage cells is read through a third data port while data stored in a second portion of the plurality of data storage cells is independently and simultaneously processed though the second port and while data is independently and simultaneously received through the first port from the first data bus and stored into a third portion of the plurality of storage cells.

30. An interface apparatus, comprising:

a multi-port memory having a plurality of data storage cells and having at least three independent bi-directional data ports that are configured to simultaneously and independently write data to and read data from the plurality of data storage cells without allocation of access between the data ports and the plurality of data storage cells;

first means for coupling a first port of the bi-directional data ports to a first bi-directional data bus;

second means for coupling a second port of the bi-directional data ports to a second bi-directional data bus; and a processor coupled to a third port of the bi-directional data ports for operating on data in the plurality of data storage cells.

* * * * *